Nov. 12, 1929.        Y. MURAKAMI        1,735,293
BLAST FURNACE
Filed Sept. 14, 1926
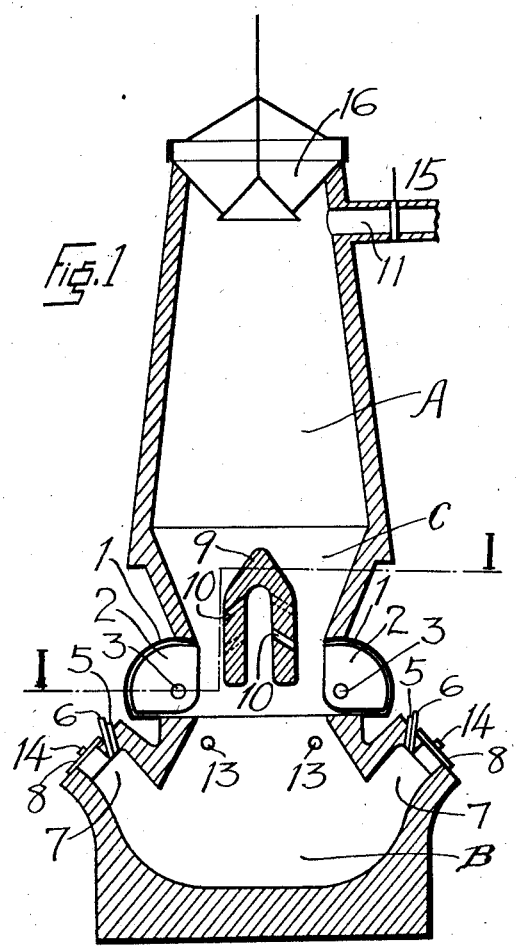
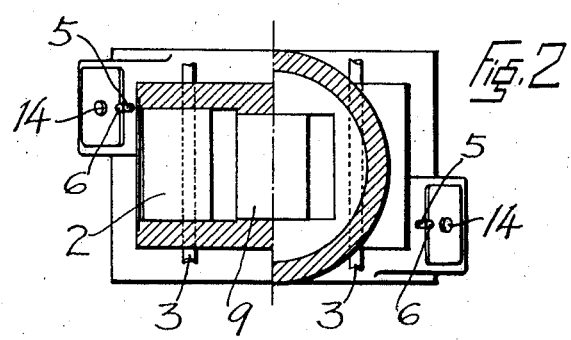
Inventor:
Y. Murakami
By Attorneys: Marks & Clerk Patented Nov. 12, 1929

1,735,293

UNITED STATES PATENT OFFICE

YOSHIMICHI MURAKAMI, OF OAZA, HIRATSUKA-MURA, EBARA-GORI, TOKYO PREFECTURE, JAPAN

BLAST FURNACE

Application filed September 14, 1926, Serial No. 135,375, and in Japan September 28, 1925.

This invention relates to an apparatus for the manufacture of molten pig iron or steel from ore and it comprises in general, a blast furnace having an upper shaft as is customary, a lower hearth in which smelting may be accomplished, an intermediate throat-like passage connecting the upper and lower parts of the furnace, an element disposed in the throat-like passage, generally bell-shaped and having orifices in the wall thereof, and rotating closure means whereby the upper part of the furnace may be cut off from the lower part.

Numerous attempts have been made to so control the action of a blast furnace that the raw material with which the furnace is charged, can be converted into pig iron or molten steel in the hearth of the furnace. When molten steel is manufactured in a blast furnace, the hearth of the furnace is rapidly damaged because of the high temperature in the hearth and because of the chemical action of the slag formed. Furthermore when iron ore containing titanium is refined in the same way as ordinary ore is processed, infusible substances are formed which adhere to the hearth of the furnace. These difficulties make the smelting of iron ore containing titanium in a blast furnace uneconomical because of the damage to the furnace and because of the expense and time consumed before the furnace is again in condition for operation. The same disadvantages result when steel is made in the hearth of the furnace. It is the object of my invention to devise a furnace which obviates the aforementioned difficulties and makes it possible to manufacture molten steel in the hearth as well as the processing of iron ore rich in titanium.

In the accompanying drawings, I have illustrated by way of example, a form of apparatus in accordance with my invention.

In the drawings:

Figure 1, represents a cross sectional elevation of my furnace and,

Figure 2, is a sectional elevation taken along the line 1.

Referring more particularly to Figure 1, my improved blast furnace comprises a shaft A, a hearth C and a throat-like connecting passage denoted by B. In the passage B, there is disposed a bell-shaped element 9 having inclined openings 10. A conduit 11, provided with a slide valve 15 at the top of the shaft A, permits the gases to escape and a charging device 16 for ore, coke and flux is also disposed at the top of the shaft A.

Tuyères 5 and 6 are provided for the admission of air and tuyères 13 are further provided for the admission of cooled gas as will be further described.

At the sides of the hearth C, doors 8 having peep holes 14 are provided.

In the restricted throat-like portion B, rotating valves 2 are arranged to rotate on the spindles 3 whereby on rotation of the valves towards the center of the furnace, the upper part of the furnace A can be cut off from the lower part C, the valves when in closed position abutting against the bell-shaped element 9. In this position however, it is to be observed that communication between A and C is not fully cut off inasmuch as gases may flow from C into the interior of the bell-shaped element 9 through the orifices or conduits 10 therein and thus into the upper part of the furnace. The closing of the valves 2 merely acts to cut off the descent of solid material in A into the hearth C. Cover plates 1 are provided to close in the valves as shown.

In the operation of my furnace, when first starting the furnace, the valves 2 are closed so that the charge in A cannot descend through the restricted throat onto the hearth. A mixture of ore, flux and coke is then charged through the charging device 16. Air is blown into the hearth through the tuyères 5 and 6 while fuel, such as a heavy oil, pulverized coal and the like, is injected through the other tuyères, for instance, 13. The products of combustion pass up into the bell-shaped element 9 and thence through the orifices 10 and thereafter ascend through the charge in the shaft A, finally leaving the furnace through the conduit 11. When the temperature of the furnace, and especially that part adjacent the valves 2 is raised sufficiently high, relatively cooled gas, such as the exit gas from the blast furnace, or cool producer gas and the like may be supplied through tuyères 13 to keep the lower part of the charge, that is, adjacent the valves 2 from forming a zone of fusion. The supply of cooling gas must be regulated according to the temperature of the lower part of the charge and this temperature may be measured by the aid of a pyrometer inserted therein. It is advantageous to but partially burn fuel injected through one of the tuyères, say 6, so that the products of the incomplete combustion can be used to reduce the ore in the furnace.

After a time, the ore in the bottom part of the shaft A, that is, the ore within the throat-like restriction B, is practically reduced although some still remains as oxide. When this condition is realized, the valves 2 are open and the charge in the shaft A is allowed to descend onto the hearth C wherein it is subjected to smelting in such a manner that the hot gases produced during the smelting are forced to pass through the charge on the hearth and through the charge remaining in shaft A and passage B, just as in an ordinary blast furnace, the combustion being furthered by the injection of a hot blast through the tuyères 5 and 6. In this way, the reduction and preheating of the charge is carried out in the shaft A of the furnace and molten iron is obtained in the hearth which may be tapped as is customary. Carbon in the molten iron may be diminished during the melting by the injection of powdered ore through the tuyères 5 or 6. Either pig iron or steel can be produced by the regulation of the conditions on the hearth during this stage.

The contents of the shaft A are allowed to descend onto the hearth C until the proper amount of iron is obtained.

When further refining of the material on the hearth is desired, the valves 2 may be closed and the charge on the hearth C entirely melted, the condition of the material on the hearth being observed through peep holes 14. The molten metal on the hearth may be subjected to such refining operation as is necessary in order to obtain molten metal of a particularly desired composition as in an ordinary open hearth or as in a reverberatory furnace. For instance, a sample of molten metal can be removed for purposes of analysis and if necessary, pig iron, iron alloy, ore or flux may be added through the doors 8 in order to regulate the final composition of the metal. During this refining, hot blast and fuel supplied respectively through the tuyères 5 and 6 may be so controlled as to generate reduced gases for the reduction of iron ore maintained above the closed valves 2.

It will be observed that in my furnace I provide a method of refining the metal on the hearth at the same time utilizing any reducing gases formed for the purpose of reducing ore kept above the hearth and separated therefrom. When the heart is damaged, repairs can be performed without removing the charge in the shaft A. As a result, the active life of the furnace is greatly increased because but little time is required for making repairs. Thus for instance, if the hearth is damaged, the valves 2 are closed, the charge in the shaft A being retained, the hearth C of the furnace is emptied, and the repairs made, all of this without the necessity for completely emptying the shaft. Furthermore, the provision of valves 2 makes it possible to regulate the descent of the charge so that the operations carried out on the hearth can be controlled within a wide range.

Inasmuch as the valves 2 and the bell-shaped element 9 are subject to high temperature, it is desirable that these elements be provided with cooling devices as is customary.

Having thus described my invention, what I claim is:

1. A blast furnace comprising a shaft member to contain ore, a hearth member disposed beneath said shaft member, an intermediate member providing communication between the shaft member and the hearth member and means associated with said intermediate member to control the descent of ore from the shaft member onto the hearth member, said means comprising a bell-shaped member disposed in said intermediate member and spaced from the walls thereof, said bell-shaped member having orifices in the walls thereof, and closure means associated with said intermediate member and said bell-shaped member whereby the descent of ore from said shaft member through the space between the bell-shaped member and the walls of the intermediate member may be controlled.

2. A blast furnace comprising a shaft member to contain ore, a hearth member disposed beneath said shaft member, an intermediate member providing communication between the shaft member and the hearth member and means associated with said intermediate member to control the descent of ore from the shaft member onto the hearth member, said means comprising a bell shaped member disposed in said intermediate member and spaced from the walls thereof, said bell-shaped member having orifices in the walls thereof to allow the passage of gases from the hearth member to the shaft member, closure means comprising rotary valves so disposed in said intermediate member that upon rotation of the valves towards the center of the furnace, the valves abut against the bell-shaped member and thus prevent ore from descending from the shaft onto the hearth, the orifices in said bell-shaped member terminating above the point of contact of the valve with the bell-shaped member whereby gases may pass from the hearth to the shaft when the valves are in closed position.

In testimony whereof I affix my signature.

YOSHIMICHI MURAKAMI.